United States Patent [19]

Nolan et al.

[11] Patent Number: 5,476,611
[45] Date of Patent: * Dec. 19, 1995

[54] ELECTROOPTICAL LIQUID CRYSTAL SYSTEM

[75] Inventors: Patrick Nolan, Poole; David Coates, Wimborne, both of United Kingdom

[73] Assignee: Merck Patent Gesellschaft mit Beschrankter Haftung, Darmstadt, Germany

[*] Notice: The portion of the term of this patent subsequent to Jun. 21, 2011, has been disclaimed.

[21] Appl. No.: 41,422

[22] Filed: Mar. 31, 1993

[30] Foreign Application Priority Data

Mar. 31, 1992 [EP] European Pat. Off. ............ 92105531

[51] Int. Cl.⁶ .................... C09K 19/52; C09K 19/34; C09K 19/12; G02F 1/13
[52] U.S. Cl. .................... 252/299.01; 252/299.61; 252/299.63; 252/299.66; 359/103
[58] Field of Search ................ 252/299.61, 299.63, 252/299.66, 299.01; 359/103

[56] References Cited

U.S. PATENT DOCUMENTS

| | | | |
|---|---|---|---|
| 4,688,900 | 8/1987 | Doane et al. | 359/96 X |
| 4,891,152 | 1/1990 | Miller et al. | 252/299.01 |
| 4,971,719 | 11/1990 | Vaz et al. | 252/299.5 |
| 4,994,204 | 2/1991 | Doane et al. | 252/299.01 |
| 5,011,624 | 4/1991 | Yamagishi et al. | 252/299.5 |
| 5,225,104 | 7/1993 | Van Steenkiste et al. | 252/299.01 |
| 5,323,251 | 6/1994 | Coates et al. | 359/51 |
| 5,344,587 | 9/1994 | Coates et al. | 252/299.66 |
| 5,356,557 | 10/1994 | Jubb et al. | 252/299.01 |

FOREIGN PATENT DOCUMENTS

| | | |
|---|---|---|
| 0272585 | 6/1988 | European Pat. Off. . |
| 0313053 | 4/1989 | European Pat. Off. . |
| 0533034 | 3/1993 | European Pat. Off. . |
| 89/06264 | 7/1989 | WIPO . |
| 9109092 | 6/1991 | WIPO . |

Primary Examiner—Richard D. Lovering
Assistant Examiner—C. Harris
Attorney, Agent, or Firm—Millen, White, Zelano & Branigan

[57] ABSTRACT

An electrooptical system containing a PDLC film is disclosed. The precursor of the PDLC film comprises (a) 30–85 wt. % of a liquid crystal mixture containing one or more compounds of the formula I

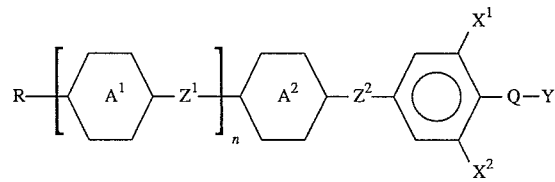

wherein R, $Z^1$, $Z^2$, $A^1$, $A^2$, $X^2$, $X^2$, Q, n and Y are as defined herein, (b) 15–68 wt. % of the precursor of the polymer matrix at least comprising
a component A containing at least 5 wt. % of one or more at least difunctional thiol monomers and/or oligomers,
a component B containing at least 10 wt. % of one or more at least difunctional monomers and/or oligomers of the ene type,
a component C containing at least 3 wt. % of one or more monofunctional monomers and/or oligomers of the ene type with a molar mass of less than 250 g/mol,
optionally a component D containing polymerizable compounds other than ene-type or thiol-type compounds; and (c) 0.1–5 wt. % of a radical photoinitiator, with the mass ratios given under (a), (b) and (c) being related to the mass of the precursor of the PDLC film and the mass ratios of the components A, B and C relating to the mass of the precursor of the polymer matrix.

20 Claims, 2 Drawing Sheets

ELECTROOPTICAL LIQUID CRYSTAL SYSTEM

BACKGROUND OF THE INVENTION

The invention relates to an electrooptical liquid crystal system which between 2 electrode layers contains a PDLC film comprising a liquid crystal mixture being dispersed in form of microdroplets in an optically isotropic, transparent polymer matrix, in which one of the refractive indices of the liquid crystal mixture is matched to the refractive index of the polymer matrix, and which in one of the two switching states has a reduced transmission compared with the other state independent of the polarization of the incident light.

In PDLC films (polymer dispersed liquid crystals) which are described, for example, in U.S. Pat. No. 4,688,900, Mol. Cryst. Liq. Cryst. Nonlin. Optic, 157, 1988, 427–441, WO 89/06264 and EP 0,272,585, one of the refractive indices of the liquid crystal mixture, customarily the ordinary refractive index $n_o$, is selected in such a way that it more or less coincides with the refractive index $n_p$ of the polymeric matrix. If no voltage is applied to the electrodes, the liquid crystal molecules in the droplets exhibit a distorted alignment, and incident light is scattered at the phase boundary between the polymeric and liquid crystal phases.

On applying a voltage, the liquid crystal molecules are aligned parallel to the field and perpendicular to the E vector of the transmitted light. Normally incident light (viewing angle $\theta=0°$) now sees an optically isotropic medium and appears transparent.

No polarizers are required for operating PDLC systems, as a result of which these systems have high transmission. PDLC systems provided with active matrix addressing have been proposed on the basis of these favorable transmission properties in particular for projection applications, but in addition also for displays having high information content and for further applications.

A series of matrix materials and polymerization processes have hitherto been proposed for producing PDLC systems. In the so called PIPS technology (=polymerization-induced phase separation) the liquid crystal mixture is first homogenously mixed with monomers and/or oligomers of the matrix-forming material; phase-separation is then induced by polymerization. Differentiation must further be made between TIPS (temperature-induced phase separation) and SIPS (solvent-induced phase separation) (Mol. Cryst. Liq. Cryst. Inc. Nonlin. Opt. 157 (1988) 427) both being also methods to produce PDLC films.

The process of preparation must be controlled very carefully in order to obtain systems with good electrooptical properties. F. G. Yamagishi et al., SPIE Vol. 1080, Liquid Crystal Chemistry, Physics and Applications, 1989, p.24 differentiate between a "Swiss cheese" and a "polymer ball" morphology. In the latter one, the polymer matrix consists of small polymer particles or "balls" being connected or merging into each other while in the Swiss cheese system, the polymer matrix is continuous and exhibits well defined, more or less spherical voids containing the liquid crystal. The Swiss cheese morphology is preferred because it exhibits a reversible electrooptical characteristic line while the polymer ball system shows a distinct hysteresis generally leading to a drastic deterioration of the electrooptical characteristic line when comparing the virgin and the second run.

According to Yamagishi et al., loc. cit., the Swiss cheese morphology is promoted in cases where the polymerization reaction runs via a step mechanism, and in WO 89/06264 it is pointed out that the step mechanism is favored in cases where the precursor of the polymer matrix consists of multifunctional acrylates and multifunctional mercaptanes.

When using—as was suggested in WO 89/06,264—a precursor of the polymer matrix containing multifunctional thiols and multifunctional ene compounds, i.e., multifunctional acrylates, it was observed by the present inventors that matching of the refractive indices is often difficult. This is because the thiols have a relatively high refractive index due to the high polarizibility of the sulphur atom. Trimethylolpropane tri(3-mercaptopropionate), for example, has a refractive index of 1.52, whereas multifunctional enes usually exhibit a lower refractive index typically of 1.47–1.51.

When curing a precursor of a polymer containing a multifunctional thiol and a multifunctional ene compound in substantially stoichiometric amounts, the resultant polymer usually exhibits an index of refraction which is lower than that of its pure thiol component but still rather high and typically about 1.50 or more. It is true that reducing the ratio of the thiol component gives polymer materials with a lower index of refraction but, on the other hand, in the case of PDLC films, the ratio of the thiol component must not be chosen too low if reliable formation of a Swiss cheese morphology is to be obtained. After curing, the commercially available polymer precursor NOA 65 (manufactured by Norland Products) which is widely used for the preparation of PDLC systems, exhibits a refractive index of 1.525 which is higher than the ordinary index of refraction of most liquid crystals which typically amounts to 1.49–1.52.

In PDLC systems, another complication is that the liquid crystal mixture usually tends to dissolve into the polymer matrix to a lesser or higher degree. In the polymer matrix, the liquid crystal acts as an isotropic material exhibiting a medium refractive index given via $$\bar{n}^2 = \tfrac{1}{3}(n_e^2 + 2n_o^2).$$

Inserting typical indices of refraction of a liquid crystal mixture of $n_o=1.52$ and $n_e=1.75$ yields $\bar{n}=1.6$. This phenomenon therefore leads to a further increase of the refractive index of the matrix, and the present inventors found quite generally that in order to obtain good transmission in the PDLC film, the refractive index of the precursor of the polymer matrix should be somewhat or even substantially lower than the ordinary index of refraction of the liquid crystal mixture.

With thiol-ene based precursor systems known hitherto matching of the refractive indices often is not possible or only possible to an unsatisfactory degree. A distinct improvement of matching by a corresponding design of the liquid crystal mixture generally is not possible because typical liquid crystal compounds exhibit an ordinary index of refraction considerably lower than that of thiols. The term "matching of refractive indices" does not necessarily mean that the refractive index of the polymer matrix and the ordinary index of refraction of the liquid crystal mixture are equal but is to be understood that a high maximum transmission and a low minimum transmission, i.e. a high contrast, and, in particular, a high maximum transmission or clarity of not less than 0.80 and especially of more than 0.82 are to be obtained.

The liquid crystal mixture used in PDLC films preferably has a positive dielectric anisotropy but the use of dielectrically negative liquid crystal mixtures (see, for example, WO 91/01511) or two-frequency liquid crystal mixtures (see, for example, N. A. Vaz et al., J. Appl. Phys. 65, 1989, 5043) is also discussed.

Furthermore, the liquid crystal mixture should have a high clearing point, a broad nematic range, no smectic phases down to low temperatures and a high stability and should be distinguished by an optical anisotropy Δn and a flow viscosity η which can be optimized with respect to the particular application, and by a high electrical anisotropy.

Electrooptical systems containing PDLC films can be addressed passively or actively. Active driving schemes employing an active matrix having nonlinear addressing elements integrated with the image point, are especially useful for displays with high information contents. The nonlinear elements used for preparing the active matrix type electrode film can have 2 (for example, MIM or MSI diodes, metal-insulator-metal or metal-siliconnitride-indium tin oxide) or 3 (for example, TFT, thin film transistors) connections.

More details on the addressing of liquid crystal displays by an active matrix of nonlinear elements can be found, for example, in A. H. Firester, SID, 1987, Society for information Display Seminar, Seminar 5: Active Matrices for Liquid Crystals, E. Kaneko, Liquid Crystal Displays, KTK Scientific Publishers, Tokyo, Japan, 1987, chapter 6 and 7 or P. M. Knoll, Displays, Heidelberg, 1986, p. 216 ff.

When the PDLC system is addressed by means of an active matrix, a further far reaching criterion is added to the requirements listed so far which must be fulfilled by the cured polymer and the liquid crystal mixture being embedded in microdroplets. This is related to the fact that each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the so-called holding ratio (HR) which is defined as the ratio of the drop in voltage across an image point in the nonaddressed state and the voltage applied; a process for determining the HR is given, for example, in Rieger, B. et al., Conference Proceeding der Freiburger Arbeitstagung Flüssigkristalle (Freiburg Symposium on Liquid Crystals), Freiburg 1989. Electrooptical systems having a low or relatively low HR show insufficient contrast.

It is true that considerable efforts have already been undertaken hitherto to optimize PDLC systems with respect to the precursor of the polymer matrix and the liquid crystal mixture used. On the other hand, however, it is still an open problem how to reliably obtain PDLC films which are characterized both by a Swiss cheese morphology and an excellent matching of refractive indices, i.e., a high contrast and/or, in particular, a high on-state clarity.

Furthermore, only few investigations of PDLC systems having active matrix addressing can be found in the literature, and no concepts have so far been proposed for providing electrooptical systems having a high HR, a Swiss cheese morphology and an excellent matching of indices resp. a high contrast and/or, in particular, a high on-state clarity.

Consequently, there is a high demand for non-actively addressed PDLC systems Which fulfill to a large extent the requirements described and which exhibit both a Swiss cheese morphology and an excellent matching of refractive indices resp. a high contrast and/or, in particular, a high on-state clarity. Furthermore, there is a high demand for actively addressed PDLC systems which exhibit a high HR in addition to these properties.

SUMMARY OF THE INVENTION

An object of the invention is to provide PDLC systems of this type and precursors of these PDLC systems containing monomers, oligomers and/or prepolymers of the polymer used and a liquid crystal mixture.

Upon further study of the specification and appended claims, further objects and advantages of this invention will become apparent to those skilled in the art.

It has been found that PDLC systems with a Swiss cheese morphology and an excellent matching of refractive indices resp. a high contrast and/or, in particular, a high on-state clarity can be obtained if the precursor of the PDLC system comprises a) about 30–85 wt. % of a liquid crystal mixture containing one or more compounds of the formula I

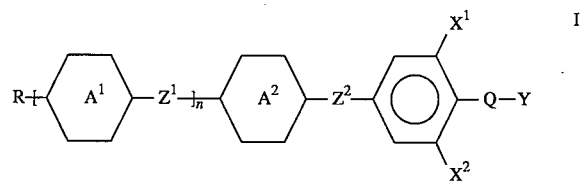

in which $Z^1$ and $Z^2$ independently of one another, are a single bond, $-CH_2CH_2-$, $-COO-$, $-OCO-$ or $-C\equiv C-$,

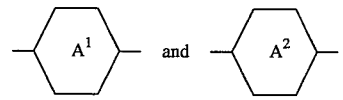

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of

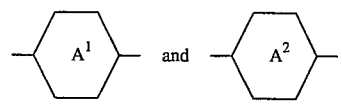

can also be pyrimidine-2,5-diyl, pyridine-2,5-diyl or trans-1,3-dioxane-2,5-diyl, $X^1$ and $X^2$ independently of one another, are each H or F, Q is $CF_2$, $OCF_2$, $C_2F_4$, $OC_2F_4$ or a single bond, Y is H, F, Cl or CN, n is 0, 1 or 2 and R is alkyl having up to 13 C atoms, in which one or two non-adjacent $CH_2$ groups can also be replaced by $-O-$ and/or $-CH=CH-$, b) about 15–68 wt. % of a precursor of a polymer matrix, the precursor comprising at least a component A containing at least 5 wt. % of one or more at least difunctional thiol monomers and/or oligomers, a component B containing at least 10 wt. % of one or more at least difunctional monomers and/or oligomers of the ene type, a component C containing at least 3 wt. % of one or monofunctional monomers and/or oligomers of the ene type with a molar mass of less than 250 g/mol, optionally a component D containing polymerizable compounds other%than ene-type or thiol-type compounds, and c) about 0.01–5 wt. % of a radical photoinitiator with the mass ratios given under a), b) and c) being related to the mass of the precursor of the PDLC film and the mass ratios of the components A, B, C and D relating to the mass of the precursor of the polymer matrix.

Furthermore, it has been found that actively addressed TFT/PDLC systems which are characterized by a Swiss cheese morphology, good transmission properties and a high HR can be obtained if the percentage of the carbonitrile compounds according to formula I (Q—Y=CN) is not too high and especially not more than 15%. Especially preferred for active matrix applications are PDLC systems in which the liquid crystal mixture contains less than 5% and in particular no carbonitriles.

Furthermore, it has been found that non-actively addressed PDLC systems which are characterized by a Swiss cheese morphology, a high contrast, a high on-state clarity and good electrooptical properties can be obtained if the liquid crystal mixture is based on carbonitrile compounds. The ratio of carbonitrile with respect to the mass of the liquid crystal mixture preferably is not less than 50% and, in particular, not less than 75%. Especially preferred are systems the liquid crystal mixture of which is being based on carbonitriles of formula I and contains at least 6 and especially 7 compounds and/or exhibits a rather high percentage of 3-ring and/or 4-ring compounds of not less than 0.18.

Non-actively addressed PDLC systems according to the present invention are especially preferred.

The invention thus relates to an electrooptical liquid crystal system which between 2 electrode layers contains a PDLC film comprising a liquid crystal mixture forming microdroplets in an optically isotropic, transparent polymer matrix, in which one of the refractive indices of the liquid crystal mixture is matched to the refractive index of the polymer matrix, which in one of the two switching states has reduced transmission compared with the other state independent of the polarization of the incident light, whose precursor of the PDLC film is selected as stated above.

The construction of the electrooptical system according to the present invention corresponds to the mode of construction customary for systems of this type. The term customary mode of construction is in this case broadly interpreted and includes adaptations and modifications.

Thus, for example, the matrix formed by the transparent medium in which the liquid crystal mixture is microdispersed or microencapsulated, is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided. One of the electrodes forms an active matrix while the other one acts as counter electrode.

The electrooptical system according to the invention can be operated reflectively or tramsmissively so that at least one electrode and, if present, the associated substrate are transparent. Both systems customarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells.

Processes for the production of PDLC films are described, for example, in U.S. Pat. Nos. 4,688,900, 4,673,255, 4,671, 618, WO 85/0426, U.S. Pat. No. 4,435,047, EP 0,272,595, Mol. Cryst. Liq. Cryst. Inc. Nonlin. Opt. 157 (1988) 427, Liquid Crystals, 3 (1988) 1543, EP 0,165,063, EP 0,345,029, EP 0,357,234 and EP 0,205,261. The formation of the PDLC film is generally achieved by 3 basic methods: in the PIPS technique (=PIPS, polymerization induced phase separation) the liquid crystal mixture, and optionally further additives, are dissolved in the precursor of the matrix material, and subsequently polymerization is started. TIPS (= thermally induced phase separation) means that the liquid crystal mixture is dissolved in the melt of the polymer followed by cooling while SIPS (= solvent induced phase separation) starts with dissolving the polymer and the liquid crystal mixture in a solvent with subsequent evaporation of the solvent. The invention is, however, not restricted to these specific techniques but covers also electrooptical systems obtained by modified methods or other methods. The use of the PIPS technology is usually preferred.

The thickness d of the electrooptical system is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 and 300 µm are given in U.S. Pat. No. 4,688,900 and between 5 and 30 µm in EP 0,313,053. The electrooptical systems according to the invention only have layer thicknesses d greater than a few mm in exceptional cases; layer thicknesses below 200 µm and especially below 100 µm are preferred. In particular, the layer thickness is about 2–50 µm, especially 3–25 µm.

An essential difference between the electrooptical liquid crystal system according to the present invention and those customary hitherto exists, however, in that the precursor of the PDLC film comprises a) 35–85 wt. % of a liquid crystal mixture containing at least one compound of formula I b) 15–68 wt. % of the precursor of the polymer matrix at least comprising a component A containing at least 5 wt. % of one or more at least difunctional thiol monomers and/or oligomers, a component B containing at least 10 wt. % of one or more at least difunctional monomers and/or oligomers of the ene type, a component C containing at least 3 wt. % of one or monofunctional monomers and/or oligomers of the ene type with a molar mass of less then 250 g/mol, optionally a component D containing polymerizable compounds other than ene-type or thiol-type compounds, and c) 0.01–5 wt. % of a radical photoinitiator with the mass ratios given under a), b) and c) being related to the mass of the precursor of the PDLC film and the mass ratios of the components A, B and C relating to the mass of the precursor of the polymer matrix.

In the following, for the sake of simplicity, Phe is 1,4-phenylene, Phe.2F is 2-fluoro-1,4-phenylene, Phe.3F is 3-fluoro-1,4-phenylene, Cyc is trans-1,4-cyclohexylene, Pyr is pyrimidine-2,5-diyl and Pyd is pyridine-2,5-diyl, the two abbreviations Pyr and Pyd comprising in each case the two possible positional isomers. Furthermore, Phe.(F) is intended to designate a 1,4-phenylene group which is monofluorinated in the 2- or 3-position. Phe.2F3F and Phe.3F5F are each 1,4-phenylene groups which are difluorinated in the 2- and 3- or 3- and 5-positions, respectively. Similarly, Phe.2F3F5F is a 1,4-phenylene group trifluorinated in the 2-, 3- and 5-positions.

Liquid crystal compounds according to formula I, wherein Y is H, F or Cl will be termed in the following as SFM compounds (superfluorinated materials) according to formula I.

Electrooptical systems whose liquid crystal mixture contains one or more binuclear compounds of the formula I2 are preferred:

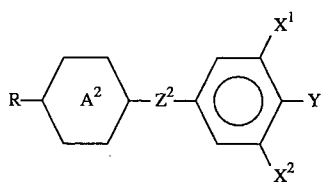

wherein R, $A^1$, $A^2$, $Z^1$, $Z^2$, $X^1$, $X^2$ and Y are as defined above in formula I.

In the compounds of the formula I2, R is preferably alkyl or alkoxy having 1–10, but in particular 1–8 C atoms, the straight-chain radicals being preferred. Furthermore, n-alkoxyalkyl compounds and in particular n-alkoxymethyl and n-alkoxyethyl compounds are preferred.

$Z^2$ is preferably —CH$_2$CH$_2$—, —COO— or a single bond, in particular a single bond or —CH$_2$CH$_2$— and very particularly a single bond. Y is —F, —Cl, —CN, —OCHF$_2$, —OCF$_3$ or —CF$_3$, preferably —F, —Cl or —CN; in case of actively addressed PDLC systems according to the present invention Y is preferably —F, —Cl or —OCF$_3$.

Compounds of the formula I2 in which at least one of $X^1$ and $X^2$ is different from H are particularly preferred.

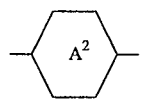

is preferably Cyc, Phe. (F), Phe.3F5F, Phe.2F3F, Pyr, Pyd or Dio and in particular Cyc, Phe. (F), Phe.3F5F, Phe.2F3F, Pyr or Pyd.

Furthermore, electrooptical systems whose liquid crystal mixture contains one or more trinuclear compounds of the formula I3 are preferred:

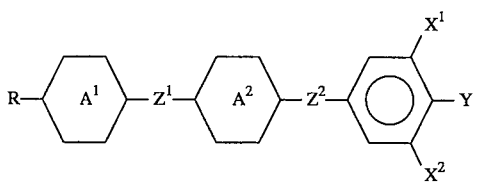

wherein R, $A^1$, $A^2$, $Z^1$, $Z^2$, $X^1$, $X^2$ and Y are as defined above in formula I.

In the compounds of the formula I3, R is preferably n-alkyl or n-alkoxy having 1–10 C atoms, furthermore also n-alkoxymethyl or n-alkoxyethyl having 1–8 C atoms and n-alkenyl having up to 7 C atoms.

Very particular preference is given to compounds of the formulae I3 in which R is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. $Z^1$ and $Z^2$ in the compounds of the formulae I3 are, independently of one another, preferably —CH$_2$CH$_2$—, —COO— or a single bond and in particular —CH$_2$CH$_2$— or a single bond. Particular preference is given to those compounds of the formula I3 in which at least one of $Z^1$ or $Z^2$ is a single bond. Y is —F, —Cl, —CN, —OCHF$_2$, —OCF$_3$ or —CF$_3$ and preferably —F, —Cl, —CN, —OCHF$_2$ or —OCF$_3$; in case of actively addressed PDLC systems according to the present invention Y is in particular —F, —Cl, —OCHF$_2$ and —OCF$_3$.

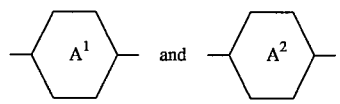

are, independently of one another, Cyc, Phe.(F), Phe.2F3F, Phe.3F5F, Phe.2F3F5F, Pyr, Pyd and Dio and in particular Cyc, Phe.(F), Phe.2F3F, Phe.3F5F, Phe.2F3F5F, Pyr and Pyd.

Furthermore, electrooptical systems whose liquid crystal mixture contains one or more tetranuclear compound as of the formula I4 are preferred:

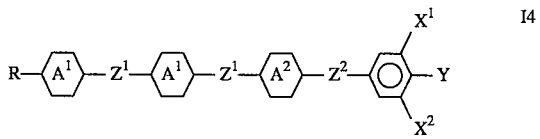

wherein R, $A^1$, $A^2$, $Z^1$, $Z^2$, $X^1$, $X^2$ and Y are as defined above in formula I.

In the compounds of the formula I4, R is preferably n-alkyl or n-alkoxy having 1–10 C atoms, furthermore also n-alkoxymethyl or n-alkoxyethyl having 1–8 C atoms.

Very particular preference is given to compounds of the formula I4 in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula I4, preferably not more than 2 and in particular only one of the bridges $Z^1$ and $Z^2$ are different from a single bond.

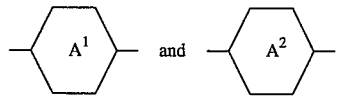

are preferably, independently of one another, Cyc, Phe.2F, Phe.3F, Phe, Pyr or Pyd. Compounds of the formula I4 in which at least one of

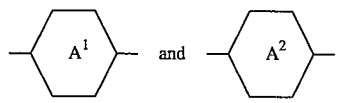

is Phe.2F or Phe.3F are preferred. The weight proportion of the compounds of the formula I4 in the liquid crystal mixture of the electrooptical systems according to the invention is preferably not too high and is in particular less than 20%, the use of lateral fluorinated compounds of the formula I4 being in many cases preferred.

The proportion of the compounds of the formula I in the liquid crystal mixtures used according to the invention is preferably not too small and is in particular more than 15% and very particularly more than 20%. Liquid crystal mixtures containing more than 40% and in particular not less than 50% of compounds of the formula I are particularly preferred.

The liquid crystal mixtures used according to the invention can contain further components which are preferably selected from nematic or nematogenic (monotropic or isotropic) substances, in particular substances from the group comprising azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoate, cyclohexylphenyl cyclohexanecarboxylate, or cyclohexylphenyl cyclohexylcyclohexanecarboxylate, phenylcyclohexanes, cyclohexylbiphenyls, phenylcyclohexylcyclohexanes, cyclohexylcyclohexenes, cyclohexylcyclohexylcyclohexenes, 1,4-bis(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethenes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electrooptical systems according to the invention preferably also contain one or more dielectrically neutral compounds of the formulae 1-2:

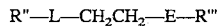

In the formulae 1 and 2 L and E, which may be identical or different, are each, independently of one another, a bivalent radical from the group comprising —Phe—, —Cyc—, —Phe—Phe—, —Phe—Cyc—, —Cyc—Cyc—, —Pyr—, —Dio—, —G—Phe— and —G—Cyc— and mirror images thereof, Phe being unsubstituted or fluorine-substituted 1,4-phenylene, Cyc being trans-1,4-cyclohexylene or 1,4-cyclohexenylene, Pyr being pyrimidine-2,5-diyl or pyridine-2,5-diyl, Dio being 1,3-dioxane-2,5-diyl and G being 2-(trans-1,4-cyclohexyl) ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from compounds of the formulae 1 and 2, in which L and E are selected from the group comprising Cyc, Phe and Pyr and simultaneously one or more components are selected from the compounds of the formulae 1 and 2, in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and, if desired, one or more components are selected from the compounds of the formulae 1 and 2, in which the radicals L and E are selected from the group comprising —Phe—Cyc—, —Cyc—Cyc—, —G—Phe— and —G—Cyc—.

R'" and R" in the compounds of the formulae 1 and 2 are each, independently of one another, preferably alkyl, alkenyl, alkoxy, alkenyloxy or alkanoyloxy having up to 8 carbon atoms. In most of these compounds, R'" and R" are different from one another, one of these radicals being in particular alkyl, alkoxy or alkenyl.

Especially preferred is the following smaller group of dielectrically neutral compounds of formulae 3 and 4

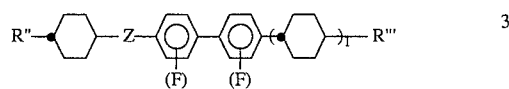

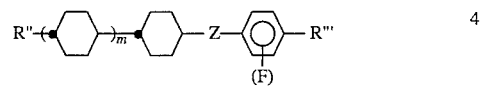

wherein
the meaning of R" and R'" is the same as given for formulae 1 and 2,
Z is independently from each other a single bond or —CH$_2$CH$_2$—,
l and m are independently from each other 0 or 1, and

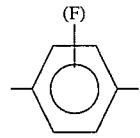

denotes 1,4-phenylene, 2-fluoro-1,4-phenylene or 3-fluoro-1,4-phenylene.

The weight proportion of the compounds of the formulae 1–4 in the liquid crystals used according to the invention is preferably 0–50% and in particular 0–40%.

The liquid crystal mixtures used in the electrooptical systems according to the invention preferably contain 1–100%, in particular 5–95%, of compounds of the formula I. The liquid crystals preferably contain 1–20, but in particular 1–15, and very particularly 1–12 compounds of the formula I.

One skilled in the art can select additives for the liquid crystal mixtures described from the large pool of nematic or nematogenic substances in such a manner that the birefringence Δn and/or the ordinary refractive index no and/or other refractive indices and/or the viscosity and/or the dielectric anisotropy and/or further parameters of the liquid crystal are optimized with respect to the particular application.

The liquid crystal mixture can contain further additives such as, for example, chiral compounds and other customary additives. The concentration of such additives is preferably not more than 7.5% and, in particular, lower than 5%.

It was found out in extensive experiments by the present inventors that with conventional thiol-ene based precursors known in the state of the art, matching of the refractive indices often is either not possible or only possible to an unsatisfactory degree which results in PDLC film with insufficient contrast and, in particular, with an unsatisfactory on-state clarity.

A typical example is thee commercially available thiol-ene precursor system NOA65 (prepared by Norland Products) which is widely used for the preparation of PDLC systems. The 4 primary constituents of NOA65 are trimethylolpropane diallyl ether, trimethylolpropane tris thiol, isophorone diisocyanate ester and benzophenone as a photoinitiator. Using pure NOA65 alone yields a refractive index of the cured film of 1,525. When combining NOA65 with the liquid crystal mixture E7 from Merck Ltd., GB which consists of 51.0% of 4-pentyl-4'-cyanobiphenyl
25.0% of 4-heptyl-4'-cyanobiphenyl
16.0% of 4-octoxy-4'-cyanobiphenyl
8.0% of 4-peptyl-4'-cyanoterphenyl and exhibits an ordinary refractive index n=1,522, the refractive index of the cured matrix rises to 1.54 and the ordinary index of refraction of the mixture decreases somewhat.

The reason for these changes of the refractive indices is
   that the liquid crystal mixture is partly dissolved in the cured polymer, and
   that the precursor is not completely reacted with a part of it remaining in the liquid crystal droplets as was confirmed, for example, by G. Smith et al. Mol. Cryst. Liq. Cryst., 146 (1987) 1–15. The cured PDLC film is treated with a roll thus squeezing out the liquid crystal from the droplets, and the liquid crystal thus obtained is then analyzed, for example, via gas chromatography.

The cured NOA65/E7-system thus exhibits a considerable mismatch of the refractive indices which results in a distinct reduction of on-state transmission.

It was found quite generally by the present inventors that curing of conventional thiol-ene based precursors of the PDLC film usually results in a distinct increase of the refractive index of the cured film compared to the refractive index of the precursor while the ordinary refractive index of the liquid crystal mixture changes only slightly.

The refractive index of thiol-ene based precursors, however, is usually relatively high because the percentage of the thiol component must not be chosen too low if a Swiss cheese morphology is to be obtained reliably. The influence of the thiol concentration of the precursor of the polymer matrix on the electrooptical properties of the PDLC system can be taken from the following table 1.

TABLE 1

| Example No. | Composition of precursor of PDLC film | $T_{min}$ | $T_{max}$ | $V_{sat}$ [V] |
|---|---|---|---|---|
| 1 | 60% LCI<br>8% TMPTMP<br>7.9% EHA<br>7.9% E270<br>15.8% TMPTA<br>0.4% D1173 | 0.014 | 0.815 | 39 |
| 2 | 60% LCI<br>4% TMPTMP<br>8.9% EHA<br>8.9% E270<br>17.9% TMPTA<br>0.4% D1173 | 0.08 | 0.813 | 50 |
| 3 | 60% LCI<br>2% TMPTMP<br>9.4% EHA<br>9.4% E270<br>18.8% TMPTA<br>0.4% D1173 | 0.01 | 0.738 | 55 |
| 4 | 60% LCI<br>9.9% EHA<br>9.9% E270<br>19.8% TMPTA<br>0.4% D1173 | 0.012 | 0.42 | 120 |

In table 1, the following abbreviations are used:
LCI liquid crystal mixture I (see composition below)
EHA ethyl hexyl acrylate
E 270 Ebecryl 270 (commercially available polyurethanediacrylate oligomer)
TMPTA 2-ethyl-2-(hydroxymethyl)-1,3-propandiol triacrylate
TMPTMP trimethylolpropane tri(3-mercaptopropionate)
D1173 Darocur® 1173 (a radical photoinitiator available through E. Merck, Germany)

$T_{min}$ and $T_{max}$ are, respectively, the minimum and maximum transmission, and $V_{sat}$ is the saturation voltage which corresponds to the lowest voltage for which $T_{max}$ is observed.

The PDLC films obtained in Examples No. 1–4 were obtained by filling the precursor of the PDLC film in a 20 μm cell with subsequent irridiation with a low power Xenon lamp producing 3 mW/Cm² for 5 minutes.

One takes from table 1 that the maximum transmission is very poor at a TMPTMP concentration of 2% with respect to the mass of the precursor of the PDLC film, respectively, 5% with respect to the mass of the precursor of the matrix. This cannot be explained by a mismatch of the refractive indices of the matrix and the ordinary refractive index of LCI ($n_o$ (LCI)=1.527) because the refractive index of the PDLC film changes only by 0.2% when increasing the TMPTMP concentration from 5 to 10% with respect to the mass of the matrix, but the poor transmission values in example 3 are due to a wrong morphology (no Swiss cheese) as was confirmed by SEM.

At a TMPTMP concentration of 4% with respect to the mass of the precursor of the PDLC film, respectively, 10% with respect to the mass of the precursor of the matrix, the cured PDLC film exhibits good values of transmission but a rather high saturation voltage of 50 V which can be reduced to 39 V when the TMPTMP concentration ms increased to 20% with respect to the mass of the precursor of the matrix. The transmission values are changed only little when the TMPTMP concentration is changed from 10% to 20% (with respect to the mass of the precursor of the matrix). In general, $V_{sat}$ should be as low as possible. Values for $V_{sat}$ of less than 45 V, particularly not more than 40 V, are preferred and saturation voltages of less than 25 V are especially preferred.

In extensive experiments the present inventors found that the percentage of the thiol component A of the precursor of the matrix is preferably chosen to be rather high or high in order to obtain Swiss-cheese morphology and good electrooptical properties. Specifically it was found, that the percentage of the thiol component should be not less than 5.0%, preferably not less than 7.5%, especially more than 10% and in particular at least 15% with respect to the mass of the precursor of the matrix. Especially preferred are PDLC films with the precursor of its polymer matrix comprising at least 20% of one or more thiols.

The high percentage of the thiol component, however, results in a relatively high to high refractive index of the precursor of the PDLC film which quite generally further increases during curing. With state-of-the-art precursors of matrix, this usually results in a mismatch of the refractive indices in the cured PDLC film which is not tolerable.

Another point is that conventional thiol-ene based precursors of the polymer matrix often exhibit a reduced solubility of the liquid crystal mixture which is due to the low to very low solubility of liquid crystal mixtures in the thiol component. This results in a reduced contrast (lower off-state opacity) and higher switching voltages.

It was found out in extensive experiments by the present inventors that electrooptical systems with improved properties which in particular do not exhibit the disadvantages mentioned above or exhibit them only to a lesser degree, can be obtained if the precursor of the polymer matrix at least comprises

- a component A containing at least 5% of one or more at least difunctional thiol monomers and/or oligomers,
- a component B containing at least 10% of one or more at least difunctional monomers and/or oligomers of the ene type,
- a component C containing at least 3 wt. % of one or monofunctional monomers and/or oligomers of the ene type with a molar mass of less than 250 g/mol, and
- optionally a component D containing one or more polymerizable compounds other than ene-type or thiol-type compounds, with the percentages given being related to the mass of the precursor of the polymer matrix.

BRIEF DESCRIPTION OF THE DRAWINGS

FIGS. 1a and 2a graphically illustrate electrooptical characteristics for conventional systems, whereas FIGS. 1b and 2b graphically illustrate electrooptical characteristics for systems according to the invention.

NOA65 contains about 40% of trimethylolpropane tris thiol and comprises trimethylolpropane diallyl ether as a difunctional ene component; NOA65 further contains benzophenone as a photoinitiator.

The system according to the present invention is based on NOA65 and contains 2-ethylhexyl-acrylate (EHA) as an additional low molecular weight ene component (M= 184 g/mol).

The properties of the state of the art system and the system according to the present invention are compared in the following table.

|  | $T_{max}$ | $T_{min}$ | $V_{th}/V$ | $V_{sat}/V$ |
|---|---|---|---|---|
| NOA65/E7; FIG. 1a (state of the art) | 0.845 | 0.125 | 20.2 | 59.8 |
| NOA65/EHA/E7, FIG. 1b (system according to the invention) | 0.832 | 0.034 | 7.6 | 19.1 |

Both systems were obtained by capillary filling the respective precursor between two ITO coated glass substrates and subsequent curing (medium pressure mercury lamp, producing 500 mW/cm$^2$). The cell thickness was chosen to be 20 μm. The transmission of 1.0 refers to a set-up containing no cell (i.e. for air).

Figure 1:
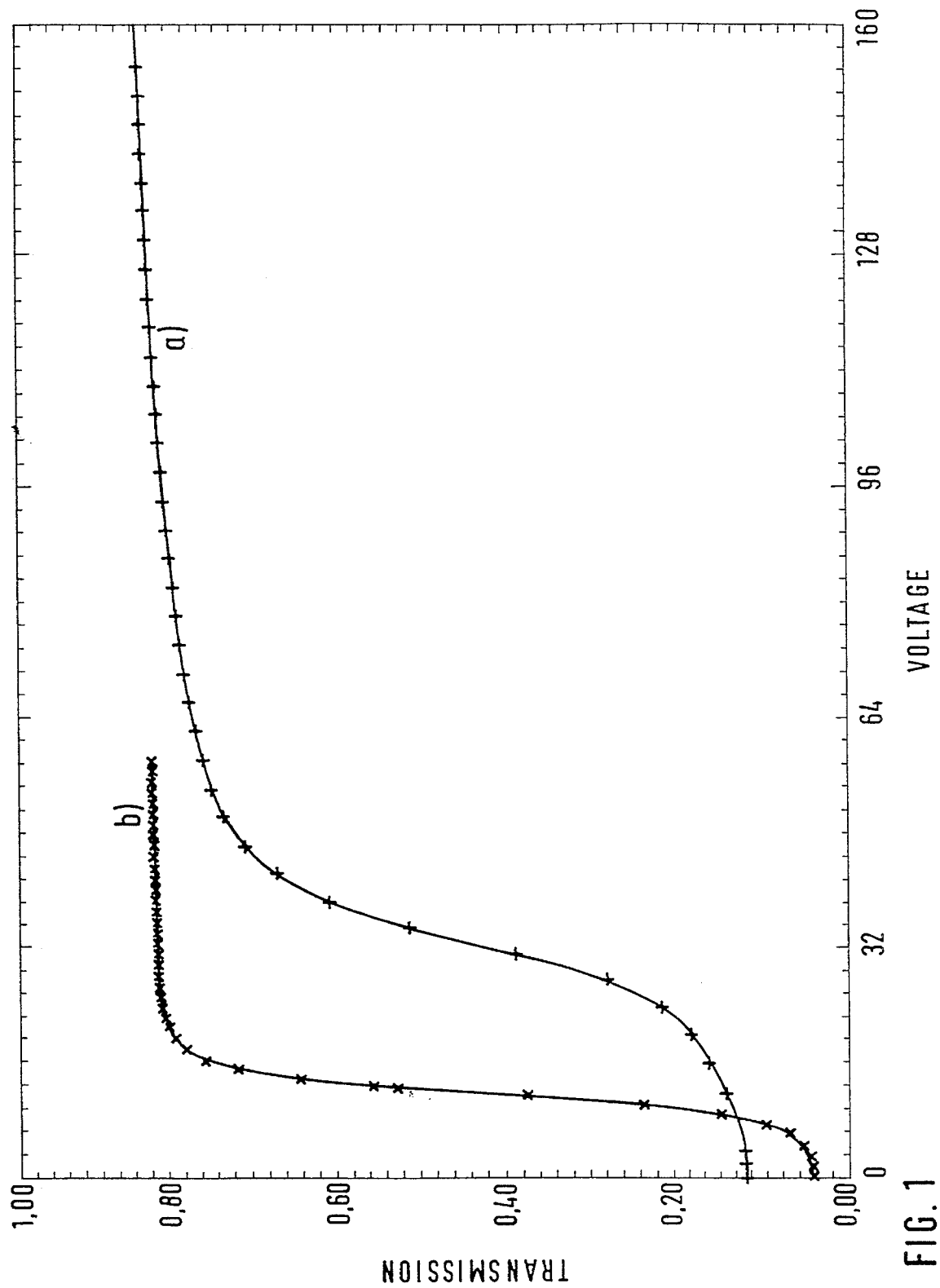
In FIG. 1, electrooptical characteristics lines are compared for a conventional system (FIG. 1a) consisting of
- 60% of E7
- 40% of NOA65 and and for a system according to the present invention (FIG. 1b) containing
- 60.0% of E7
- 32.0% of NOA65
- 7.8% of EHA and
- 0.2% of Darocur® 1173

It is evident from FIG. 1 that the system according to the present invention is distinctly superior to the conventional NOA65/E7 system. The system according to the present invention exhibits a lower off-state transmission, a higher transmission at least for voltages below 100 V, a distinctly lower threshold voltage and a steeper electrooptical characteristic line. The addition of EHA results in a considerable reduction of the refractive index of the uncured precursor of the PDLC film and to a much better index matching which can be observed as a drastical improvement of the transmission characteristics.

Figure 2:
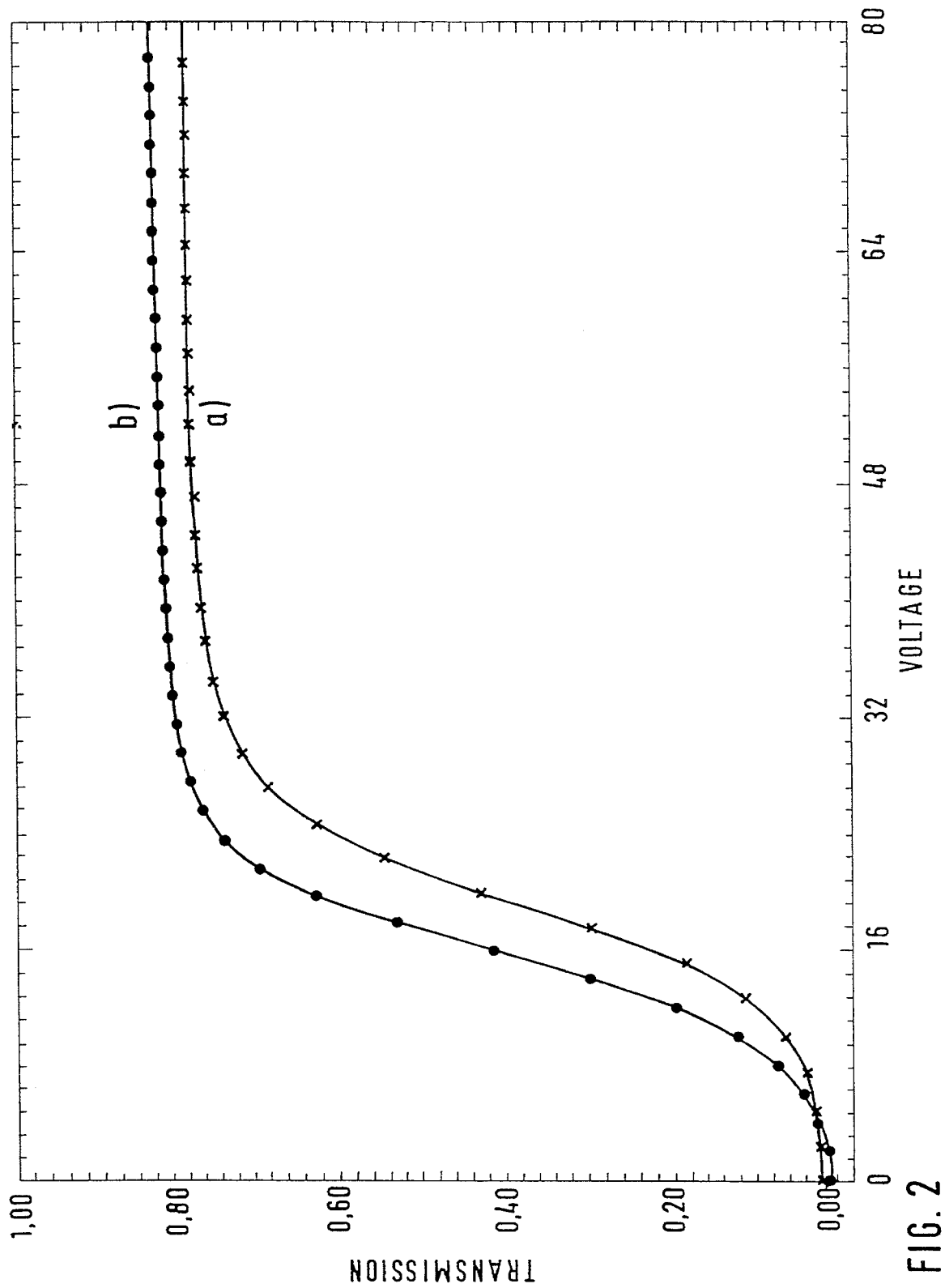

FIG. 2 shows a comparison of the electrooptical characteristics lines for a conventional system (FIG. 2a) consisting of
- 55% of NOA 65
- 45% of LCI and and a system according to the present invention (FIG. 2b) consisting of
- 55.0% of LCI
- 36.0% of NOA65
- 8.8% of EHA and
- 0.2% of Darocur® 1173.

The liquid crystal mixture LCI (commercially available as BLO36 through Merck Ltd., Poole, GB) used in these systems consists of
- 6.75% of 4-ethyl-4'-cyanobiphenyl
- 18.76% of 4-pentoxy-4'-cyanobiphenyl
- 8.75% of 4-hexoxy-4'-cyanobiphenyl
- 10.01% of 4-(trans-4-pentylcyclohexyl)-4'-cyanobiphenyl
- 4.97% of 4-pentyl-4"-cyanoterphenyl
- 30.00% of 4-pentyl-4'-cyanobiphenyl
- 18.76% of 4-(4-propylphenyl)-3-fluoro-4'-cyanobiphenyl and exhibits the following properties:
- clearing point 95%
- dielectrical anisotropy 17.0 (1 kHz, 20° C.)
- birefringence 0.267 (589 nm, 20° C.)
- ordinary index of refraction $n_o$=1.527.

It can be taken from FIG. 2 that the system according to the present invention is superior to a state of the art thiol-ene system even in case a liquid crystal mixture with a relatively high ordinary index of refraction is used; an improvement is observed with respect to off-state transmission, on-state transmission and threshold voltage.

The present inventors have found quite generally that the transmission characteristics of thiol-ene based systems can be modified only to a rather limited and insufficient degree by varying the composition of the liquid crystal mixture alone. The ordinary index of refraction of liquid crystal mixtures can usually be varied only within a rather restricted range, and its solubility in conventional thiolene based systems also is not very sensitive to changes in its composition.

The inventors of the present found out that a decisive improvement of the optical properties of thiol-ene based systems only can be obtained by modifying the composition of the precursor of the polymer matrix. In particular, it turned out that the addition of

- an ene component C containing at least 3% of one or more monofunctional monomers and/or oligomers with a molar mass less than 250 g/mol to a more or less conventional thiol-ene system comprising

- a component A containing at least 5% of one or more at least difunctional thiol monomers and/or oligomers
- a component B containing at least 10% of one or more di- or higher functional monomers and/or oligomer of the ene type, and
- optionally a further component D containing polymerizable compounds other than ene-type or thiol-type compounds, results in a distinct improvement of the properties of the precursor of the matrix and of the electrooptical system. This is especially true for PDLC systems the precursor of which comprises such precursor of the matrix and a liquid crystal mixture which is based on carbonitriles.

Examples of low molecular weight compounds suited for component C are vinyl chlorides, vinylidene chlorides, acrylonitriles, methacrylonitriles, acrylamides, methacrylamides, methylacrylate or -methacrylates, ethylacrylates or -methacrylates, n- or tert-butylacrylates or -methacrylates, cyclohexylacrylates or -methacrylates, 2-ethylhexylacrylates or -methacrylates, benzylacrylates or -methacrylates, phenyloxyethylacrylates or -methacrylates, hydroxyethylacrylates or -methacrylates, hydroxypropylacrylates or -methacrylates, lower alkoxyethylacrylates or -methacrylates, tetrahydrofufuryl acrylates or -methacrylates, vinyl acetates, vinyl propionates, vinyl butyrate and styrenes. Also preferred are partly or fully fluorinated monomers such as octafluoropentyl acrylate; partly halogenated and, in particular fluorinated monofunctional ene-compounds and/or monofunctional ene-oligomers can have a higher molar mass of up to 400 g/mol and, in particular, up to 350 g/mol.

The compounds enumerated are intended to be illustrative without limiting the scope of the invention. Especially preferred are acrylate type compounds.

The precursor of the polymer matrix preferably contains at least 5%, especially at least 7.5%, in particular more than 15% and very specifically not less than 20% of component C.

Component B contains one or more di- or higher functional monomers of the ene type (= monomers with at least two

groups). Examples for preferred monomers are divinylbenzenes, diallyl ethers, ethylene diacrylates, 1,6-hexandiol diacrylates, bisphenol A diacrylates and dimethacrylates, trimethylol propane diacrylates, pentaerythritol triacrylates, triethylene glycol diacrylates, ethylene glycol dimethacrylates, tripropylene glycol triacrylates, pentaerythritol triacrylates, pentaerythritol tetraacrylates, ditrimethylpropane tetraacrylates and dipentaerythritol pentaacrylates or hexaacrylates.

Examples of preferred oligomers used in component B are, for example, the commercially available oligomers Ebecryl 270 (aliphatical urethane/diacrylate), Ebecryl 1810 (polyester/tetraacrylate), Ebecryl 600 (bisphenol-A-epoxy/diacrylate) and/or Ebecryl 210.

Other di- or higher functional ene-monomers and/or oligomers can be used, and the examples given are to illustrate the invention without limiting it. The compounds of component B preferably exhibit not more than two and especially not more than one aromatic cyclic group while compounds with one or more alicyclic cyclic groups are preferred. Preferred are also compounds according to component B with no cyclic groups.

The percentage of component B with respect to the mass of the precursor of the matrix preferably is at least 15%, especially not less than 20%, and, in particular, 25% or more. A rather high or high amount of oligomers with respect to the mass of component B is usually preferred in order to reduce shrinking of the matrix during the curing step.

Examples of at least difunctional thiol compounds (=compounds with at least two SH-groups) suited for component A are 2,2'dimercaptodiethyl ether, glycol dimercaptoacetate, glycol dimercaptopropionate (also termed ethylene bis(3-mercaptopropionate)), pentaerythritol tetra(3-mercaptopropionate), pentaerythritol tetrathioglycolate, trimethylolethane tri(3-mercaptopropionate), trimethylolethane trithioglycolate, trimethylolpropane tri(3-mercaptopropionate), trimethylolpropane trithioglycolate, dipentaerythritol hexa(3-mercaptopropionate), polyethylene glycol dimercaptoacetate, and polyethylene glycol di(3-mercaptopropionate).

The compounds enumerated are intended to be illustrative without limiting the scope of the invention. Especially preferred are trimethylolpropane tri(3-mercaptopropionate) and pentaerythritol tetramercaptopropionate.

The precursor of the polymer matrix optionally can contain an additional component D comprising polymerizable compounds other than the ene-type or thiol-type compounds like, for example, compounds with two or more hydroxyl groups, two or more isocyanate groups, hydroxyl groups and/or isocyanate groups and another polymerizable groups or other compounds in order to influence and optimize the properties of the polymeric matrix. The percentage of component D with respect to the precursor of the matrix is generally less than 25 wt. %, preferably not more than 20 wt. %, especially less than 15 wt. % and in particular less than 10 wt. %. The total mass ratio of the components A, B, C and optionally D with respect to the mass of the precursor of the matrix preferably is more than 60%, especially not less than 75% and in particular at least 85%.

The precursor of the polymer matrix can contain other components such as, for example, softening agents, stabilizing agents or other additive is customary in the field of polymers. The percentage of such and further additions is, however, preferably small and does in particular, not exceed 7.5% and is especially less than 5%. Additives often tend to lower the specific resistance of the cured matrix thus decreasing the holding ratio.

It was found out that electrooptical systems according to the present invention the liquid crystal mixture of which contains at least 30%, especially not less than 40% and in particular more than 55% of one or more SFM compounds exhibits advantageous optical properties and especially a high transmission. Preferred are electrooptical systems the liquid mixture of which contains more than 90% of one or more SFM compounds and especially nothing other than SFM compounds. These systems are characterized by advantageous optical properties and by a high value of HR and a very low temperature dependence of HR. Systems of this type are especially suited for high information content display applications.

Preferred is a system containing 40–75% of a SFM-based liquid crystal mixture and, preferably 25–65%, especially 25–60%, of a precursor of the polymer matrix comprising 5–15%, in particular 5–10%, based on total weight of the polymer matrix precursor, of one or more at least difunctional thiol monomers and/or oligomers 15–75%, based on total weight of the polymer matrix precursor, of one or more at least difunctional ene-type monomers and/or oligomers, and 4–50%, based on total weight of the polymer matrix precursor, of one or more monofunctional ene-type monomers with a molar mass of less than 250 g/mol.

It was further found out that the solubility of the liquid crystal mixture in the precursor of the matrix quite generally decreases with increasing ratio of the thiol component. It was found that in cases where the mass ratio of the thiol component with respect to the mass of the precursor is more than 10%, in particular not less than 15%, especially at least 17.5% and very specifically 20% or more, electrooptical systems, the liquid crystal mixture of which is based on carbonitriles, exhibit better electrooptical properties (in particular with respect to contrast, on-state clarity and switching voltages) than systems the liquid crystal mixtures of which are being based on SFM compounds.

It was further found that electrooptical systems with improved optical properties and in particular low switching voltages can be obtained, if their liquid crystal mixture is based on carbonitriles of formula I and contains at least 6 and especially 7 compounds and/or exhibits a rather high percentage of 3-ring and/or 4-ring compounds of not less than 0.18, especially at-least 0.25 and, in particular at least 0.30.

Especially preferred is a system containing 40–85%, in particular 45–65%, of a carbonitrile based liquid crystal mixture and, preferably 15–70 wt. % and, in particular 15–65 wt. %, of a precursor of a polymer matrix comprising 12.5–40%, in particular 15–35%, based on total weight of the polymer matrix precursor, of one or more at least difunctional thiol monomers and/or oligomers 15–67.5%, based on total weight of the polymer matrix precursor, of one or more at least difunctional ene-type monomers and/or oligomers, and 10–60%, in particular 15–50%, based on total weight of the polymer matrix precursor, of one or more monofunctional ene-type monomers with a molar mass of less than 250 g/mol.

The ratio of component C with respect to the mass of the precursor of the system usually has an optimum range which can be found out by the expert rather easily and without any inventive effort.

The following table gives a modification of the system described in FIG. 1b with respect to the concentration of EHA:

| | System | | |
|---|---|---|---|
| | No. 1 as shown in FIG. 1b | No. 2 | No. 3 |
| ratio of LC mixture E7 | 60% | 60% | 60% |
| ratio of NOA65 | 32% | 34% | 30% |
| ratio of EHA | 7.8% | 5.8% | 9.8% |
| ratio of Darocur ®1173 | 0.2% | 0.2% | 0.2% |
| $V_{SAT}/V$ | 19.1 | 35 | 18.9 |
| $T_{max}$ | 83.2% | 84.5% | 77.9% |
| $T_{min}$ | 3.4% | 12.2% | 5.3% |
| Remarks | Good | red film small droplets | slow curing of the film |

The systems described in, the table, were prepared in the same way as the system of FIG. 1b.

For this particular system, the ratio of EHA (=component C) with respect to the mass of the PDLC film was found out to be optimally at least 6% and, in particular, at least 7%. The ratio of component C preferably is 4.5–25% and, in particular, 6–20% with respect to the mass of the PDLC film.

Although the optimum range of ratio of component C depends on the specific composition of each system to some degree, it was found out quite generally that the ratio of component C with respect to the mass of the PDLC film preferably is 3.5–15%, in particular, 4–15%, specifically 5.5–13% and very especially 6–10%.

The cured PDLC film according to the present invention exhibits a Swiss cheese morphology. Taking into account the ranges for the percentages of the different components mentioned above, the expert can easily determine without any inventive effort the optimum ratio of the liquid crystal mixture, the thiol component A and the acrylate-based components B and C and optionally, the additional component D of the precursor of the matrix in each specific case. Usually a few experiments are sufficient to evaluate optimum concentration ranges for the different components. The electrooptical system according to the invention are characterized by advantageous properties. They exhibit a low off-state and a high on-state transmission which is due to an improved matching of refractive indices and a rather high to high solubility of the liquid crystal mixture in the precursor of the matrix. The acceptable to good solubility of the liquid crystal mixture in the precursor of the matrix further results in good switching voltages. Systems with an SFM-type compound based precursor additional exhibit a high HR and a very low temperature dependence of HR and are therefore well suited for active matrix addressing.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding European application EP 9210553.15, are hereby incorporated by reference.

EXAMPLES

The percentages given throughout the specification are percentages by weight, and temperatures are given in degrees celsius.

EXAMPLES 5–10

In these examples electrooptical systems are obtained by filling the respective composition described in table 1 between ITO coated glass substrates with subsequent curing (medium pressure Hg lamp producing 500 mW/cm$^2$; curing time about 5.5 sec). The thickness of the electrooptical systems was in examples 5–9 20 μm, and in example 10 15 μm.

The systems are characterized by $V_{10}$, $V_{90}$, $V_{sat}$, $T_{min}$ and $T_{max}$. At the threshold voltage $V_{10}$, 10% of the maximum transmission for a specific device is observed, and correspondingly 90% of the maximum transmission at $V_{90}$. The values of transmission referred to the transmission measured without any cell (i.e. for air) which is set to be 1.0.

The electrooptical systems described in examples 5–10 are characterized by good electrooptical properties and especially by a high contrast and by good values of transmission.

TABLE 1

| No. | Composition of the electrooptical system | $T_{min}$ | $T_{max}$ | $V_{10}/V$ | $V_{90}/V$ | $V_{sat}$ |
|---|---|---|---|---|---|---|
| 5 | 50.0% of LCI<br>40.0% of NOA65<br>5.0% of BA<br>5.0% of HDDA | 0.025 | 0.842 | 25.7 | 56.1 | — |
| 6 | 60.0% of LCI<br>31.0% of NOA65<br>7.0% of OFPA<br>2.0% of HDDA | 0.080 | 0.844 | 6.1 | 108.2 | — |
| 7 | 60.0% of E7<br>30.0% of NOA65<br>19.8% of EHA<br>0.2% of D1173 | 0.053 | 0.779 | 4.2 | 18.9 | — |
| 8 | 50% of LCI<br>25% of Ebecryl 1810<br>7.5% of TMPTMP<br>17% of EHA<br>0.5% of I 651 | 0.004 | 0.821 | — | — | 41.9 |

| No. | Composition of the electrooptical system | $T_{min}$ | $T_{max}$ | $V_{10}/V$ | $V_{90}/V$ | $V_{sat}/V$ |
|---|---|---|---|---|---|---|
| 9 | 50% of LCI<br>24.5% of Ebecryl 210<br>15% of EHA<br>3.5% of HDDA<br>6.5% of TMPTMP<br>0.5% of I 651 | 0.006 | 0.822 | — | — | 20.9 |
| 10 | 50% of LCI<br>20% of Ebecryl 270<br>15% of EHA<br>7% of TMPTMP<br>7.5% of HDDA<br>0.5% of I 681 | 0.001 | 0.808 | — | — | 20.9 |

| Meaning of abbreviations | |
|---|---|
| LCI, NOA65, Ebecryl 210, 270, 1810 | see above |
| BA | butyl acrylate |
| HDDA | hexandiol diacrylate |
| D1173 | Darocur ® 1173 |
| OFPA | octafluoropentyl acrylate |
| TMPTMP | trimethylol propane tri(3-mercapto-propionate) |
| I 651, 681 | Irgacur ® 651, 681 (= commercially available photoinitiators) |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electrooptical system comprising 2 electrode layers having a PDLC film positioned therebetween, said PDLC film Comprising a liquid crystal mixture in the form of microdroplets within an optically isotropic, transparent polymer matrix;

wherein one of the refractive indices of said liquid crystal mixture is matched to the refractive index of said polymer matrix;

wherein one of the two switching states of said system has reduced transmission compared with the other switching state, independent of the polarization of the incident light; and said PDLC film is formed from a precursor comprising:

(a) 30–85 wt. % of a liquid crystal mixture containing one or more compounds of formula I

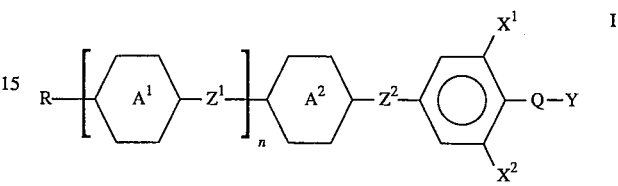

wherein $Z^1$ and $Z^2$ independently of one another, are each a single bond, $-CH_2CH_2-$, $-COO-$, $-OCO-$ or $-C{\equiv}C-$,

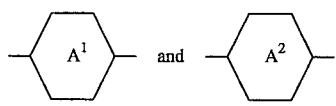

independently of one another, are each trans-1,4-cyclohexylene, 1,4-phenylene, 2-fluoro-1,4-phenylene, 3-fluoro-1,4-phenylene, 2,3-difluoro-1,4-phenylene, or 3,5-difluoro-1,4-phenylene, and one of

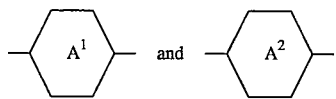

can also be pyrimidine-2,5-diyl, pyridine-2,5-diyl- or trans-1,3-dioxane-2,5-diyl, $X^1$ and $X^2$ independently of one another, are each H or F, Q is $CF_2$, $OCF_2$, $C_2F_4$, $OC_2F_4$ or a single bond, Y is H, F, Cl or CN, n is 0, 1 or 2, and R is alkyl having up to 13 C atoms, in which one or two non-adjacent $CH_2$ groups can also be replaced by $-O-$, $-CH{=}CH-$ or a combination thereof;

(b) 15–68 wt. % of a precursor of the polymer matrix comprising a component A containing at least 5 wt. % of one or more at least difunctional thiol monomers, one or more at least difunctional oligomers or combinations thereof, a component B containing at least 10 wt. % of one or more at least difunctional monomers of the ene type, one or more at least difunctional oligomers of the ene type or combinations thereof, a component C containing at least 3 wt. % of one or more monofunctional monomers of the ene type with a molar mass of less than 250 g/mol, one or more monofunctional oligomers of the ene type with a molar mass of less than 250 g/mol or combinations thereof, optionally a component D containing polymerizable compounds other than ene-type or thiol-type compounds, wherein the average overall functionality of the ene type monomers and oligomers in the polymer matrix precursor is less than 2; and (c) 0.1–5 wt. % of a radical photoinitiator, with the weight percentages given for (a), (b) and (c) being based on the total mass of the PDLC film precursor, and the weight percentages given in components A, B and C being based on the total mass of the polymer matrix precursor.

2. An electrooptical system according to claim 1, wherein said system is non-actively addressed and the liquid crystal mixture is based on carbonitrile compounds of formula I wherein Q—Y is CN.

3. An electrooptical system according to claim 2, wherein the liquid crystal mixture contains at least 6 compounds.

4. An electrooptical system according to claim 2, wherein the ratio of 3- and 4-ring compounds to 2-ring compounds in the liquid crystal mixture is not less than 0.18.

5. An electrooptical system according to claim 3, wherein the ratio of 3- and 4-ring compounds to 2-ring compounds in the liquid crystal mixture is not less than 0.18.

6. A PDLC film precursor comprising (a) 30–85 wt. % of a liquid crystal mixture containing one or more compounds of formula I

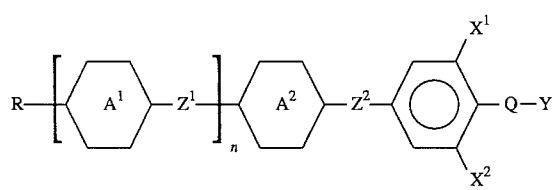

wherein $Z^1$ and $Z^2$ independently of one another, are each a single bond, —CH$_2$CH$_2$—, —COO—, —OCO+ or —C≡C—,

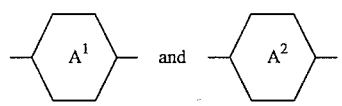

independently of one another, are each trans-1,4-cyclohexylene, 1,4-phenyl ene, 2-fluoro-1,4-phenylene, 3-fluoro-1,4-phenylene, 2,3-difluoro-1,4-phenylene, or 3,5-difluoro-1,4-phenylene, and one of

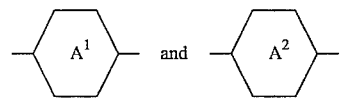

can also be pyrimidine-2,5-diyl, pyridine-2,5-diyl or trans-1,3-dioxane-2,5-diyl, $X^1$ and $X^2$ independently of one another, are each H or F, Q is CF$_2$, OCF$_2$, C$_2$F$_4$, OC$_2$F$_4$ or a single bond, Y is H, F, Cl or CN, n is 0, 1 or 2, and R is alkyl having up to 13 C atoms, in which one or two non-adjacent CH$_2$ groups can also be replaced by —O—, —CH=CH— or a combination thereof;

(b) 15–68 wt. % of a precursor of the polymer matrix comprising a component A containing at least 5 wt. % of one or more at least difunctional thiol monomers, one or more at least difunctional oligomers or combinations thereof, a component B containing at least 10 wt. % of one or more at least difunctional monomers of the ene type, one or more at least difunctional oligomers of the ene type or combinations thereof, a component C containing at least 3 wt. % of one or more monofunctional monomers of the ene type with a molar mass of less than 250 g/mol, one or more monofunctional oligomers of the ene type with a molar mass of less than 250 g/mol or combinations thereof, optionally a component D containing polymerizable compounds other than ene-type or thiol-type compounds, wherein the average overall functionality of the ene type monomers and oligomers in the polymer matrix precursor is less than 2; and (c) 0.1–5 wt. % of a radical photoinitiator, with the weight percentages given for (a), (b) and (c) being based on the total mass of the PDLC film precursor, and the weight percentages given in components A, B and C being based on the total mass of the polymer matrix precursor.

7. A PDLC film precursor according to claim 6, wherein said system is non-actively addressed and the liquid crystal mixture is based on carbonitrile compounds of formula I wherein Q—Y is CN.

8. A PDLC film precursor according to claim 7, wherein the liquid crystal mixture contains at least 6 compounds.

9. A PDLC film precursor according to claim 7, wherein the ratio of 3- and 4-ring compounds to 2-ring compounds in the liquid crystal mixture is not less than 0.18.

10. A PDLC film precursor according to claim 8, wherein the ratio of 3- and 4-ring compounds to 2-ring compounds in the liquid crystal mixture is not less than 0.18.

11. An electrooptical system comprising 2 electrode layers having a PDLC film positioned therebetween, said PDLC film comprising a liquid crystal mixture in the form of microdroplets within an optically isotropic, transparent polymer matrix;

wherein one of the refractive indices of said liquid crystal mixture is matched to the refractive index of said polymer matrix;

wherein one of the two switching states of said system has reduced transmission compared with the other switching state, independent of the polarization of the incident light; and said PDLC film is formed from a precursor comprising:

(a) 30–85 wt. % of a liquid crystal mixture containing one or more compounds of formula I

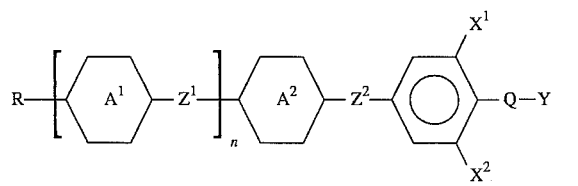

wherein $Z^1$ and $Z^2$ independently of one another, are each a single bond, —CH$_2$CH$_2$—, —COO—, —OCO— or —C≡C—,

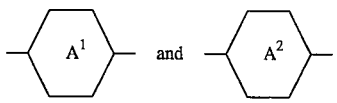

independently of one another, are each trans-1,4-cyclohexylene, 1,4-phenylene, 2-fluoro-1,4-phenylene, 3-fluoro-1,4-phenylene, 2,3-difluoro-1,4-phenylene, or 3,5-difluoro-1,4-phenylene, and one of

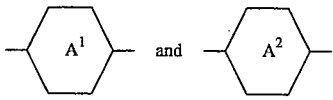

can also be pyrimidine-2,5-diyl, pyridine-2,5-diyl or trans-1,3-dioxane-2,5-diyl, X$^1$ and X$^2$ independently of one another, are each H or F, Q is CF$_2$, OCF$_2$, C$_2$F$_4$, OC$_2$F$_4$ or a single bond, Y is H, F, Cl or CN, n is 0, 1 or 2, and R is alkyl having up to 13 C atoms, in which one or two non-adjacent CH$_2$ groups can also be replaced by —O—, —CH=CH— or a combination thereof;

(b) 15–68 wt. % of a precursor of the polymer matrix comprising a component A containing at least 5 wt. % of one or more at least difunctional thiol monomers, one or more at least difunctional oligomers or combinations thereof, a component B containing at least 10 wt. % of one or more at least difunctional monomers of the ene type, one or more at least difunctional oligomers of the ene type or combinations thereof, a component C containing at least 3 wt. % of one or more monofunctional monomers of the ene type with a molar mass of less than 250 g/mol, one or more monofunctional oligomers of the ene type with a molar mass of less than 250 g/mol or combinations thereof, optionally a component D containing polymerizable compounds other than ene-type or thiol-type compounds, wherein the average overall functionality of the ene type monomers and oligomers in the polymer matrix precursor is 1.1 to less than 2; and (c) 0.1–5 wt. % of a radical photoinitiator, with the weight percentages given for (a), (b) and (c) being based on the total mass of the PDLC film precursor, and the weight percentages given in components A, B and C being based on the total mass of the polymer matrix precursor.

12. An electrooptical system comprising 2 electrode layers having a PDLC film positioned therebetween, said PDLC film comprising a liquid crystal mixture in the form of microdroplets within an optically isotropic, transparent polymer matrix;

wherein one of the refractive indices of said liquid crystal mixture is matched to the refractive index of said polymer matrix;

wherein one of the two switching states of said system has reduced transmission compared with the other switching state, independent of the polarization of the incident light; and said PDLC film is formed from a precursor comprising:

(a) 30–85 wt. % of a liquid crystal mixture containing one or more compounds of formula I

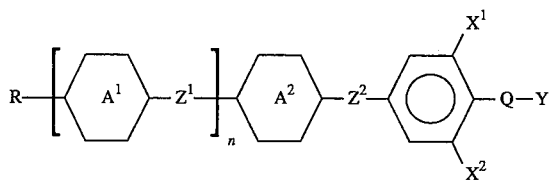

wherein

Z$^1$ and Z$^2$ independently of one another, are each a single bond, —CH$_2$CH$_2$—, —COO—, —OCO— or —C≡C—,

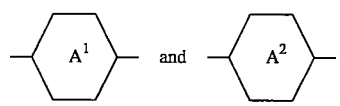

independently of one another, are each trans-1,4-cyclohexylene, 1,4-phenylene, 2-fluoro-1,4-phenylene, 3-fluoro-1,4-phenylene, 2,3-difluoro-1,4-phenylene, or 3,5-difluoro-1,4-phenylene, and one of

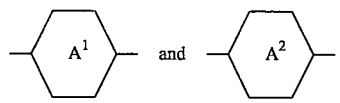

can also be pyrimidine-2,5-diyl, pyridine-2,5-diyl or trans-1,3-dioxane-2,5-diyl, X$^1$ and X$^2$ independently of one another, are each H or F, Q is CF$_2$, OCF$_2$, C$_2$F$_4$, OC$_2$F$_4$ or a single bond, Y is H, F, Cl or CN, n is 0, 1 or 2, and R is alkyl having up to 13 C atoms, in which one or two non-adjacent CH$_2$ groups can also be replaced by —O—, —CH=CH— or a combination thereof;

(b) 15–68 wt. % of a precursor of the polymer matrix consisting essentially of a component A containing at least 5 wt. % of one or more at least difunctional thiol monomers, one or more at least difunctional oligomers or combinations thereof, a component B containing at least 10 wt. % of one or more difunctional monomers of the ene type, one or more difunctional oligomers of the ene type or combinations thereof, a component C containing at least 3 wt. % of one or more monofunctional monomers of the ene type with a molar mass of less than 250 g/mol, one or more monofunctional oligomers of the ene type with a molar mass of less than 250 g/mol or combinations thereof, optionally a component D containing polymerizable compounds other than ene-type or thiol-type compounds, (c) 0.1–5 wt. % of a radical photoinitiator, with the weight percentages given for (a), (b) and (c) being based on the total mass of the PDLC film precursor, and the weight percentages given in components A, B and C being based on the total mass of the polymer matrix precursor.

13. An electrooptical system according to claim 1, wherein the average overall functionality of ene type monomers and oligomers in the polymer matrix precursor is $\leq 1.85$.

14. An electrooptical system according to claim 11, wherein the average overall functionality of ene type monomers and oligomers in the polymer matrix precursor is 1.1 up to or equal to 1.85.

15. An electrooptical system according to claim 1, wherein the PDLC film precursor exhibits a saturation voltage of less than 25 V.

16. An electrooptical system according to claim 11, wherein the PDLC film precursor exhibits a saturation voltage of less than 25 V.

17. An electrooptical system according to claim 12, wherein the PDLC film precursor exhibits a saturation voltage of less than 25 V.

18. An electrooptical system according to claim 1, wherein the polymer matrix precursor contains more than 10 wt. % of component A.

19. An electrooptical system according to claim 11, wherein the polymer matrix precursor contains more than 10 wt. % of component A.

20. An electrooptical system according to claim 12, wherein the polymer matrix precursor contains more than 10 wt. % of component A.

* * * * *